United States Patent [19]
Czohara

[11] 3,916,141
[45] Oct. 28, 1975

[54] RESISTANCE WELDING OF HONEYCOMB PANEL EDGES

[75] Inventor: Chester A. Czohara, Santa Ana, Calif.

[73] Assignee: McDonnell Douglas Corporation, Santa Monica, Calif.

[22] Filed: Dec. 3, 1973

[21] Appl. No.: 421,647

Related U.S. Application Data

[63] Continuation-in-part of Ser. No. 337,662, March 2, 1973, abandoned.

[52] U.S. Cl. ............................ 219/117 HD; 219/150
[51] Int. Cl.² .......................................... B23K 11/06
[58] Field of Search..... 219/82, 83, 117 HD, 117 R, 219/149, 150

[56] References Cited
UNITED STATES PATENTS

| | | |
|---|---|---|
| 2,108,795 | 2/1938 | Budd ........................ 219/117 HD |
| 3,581,046 | 5/1971 | Letsche........................... 219/82 |

OTHER PUBLICATIONS

H. Smallen & R. P. Romaine, Welding Journal, Apr. 1960, pp. 314–321.

Primary Examiner—Bruce A. Reynolds
Attorney, Agent, or Firm—Robert O. Richardson; Walter J. Jason; Donald L. Royer

[57] ABSTRACT

Honeycomb panel edges are crushed and resistance seam welded, then trimmed through the weld to provide a solid edging. The irregular panel edge surface due to crushed core material and voids of the cell structure, under high welding pressure, transfers an impression to the face of the copper electrode wheels which is removed as the wheels rotate during the welding operation.

2 Claims, 5 Drawing Figures

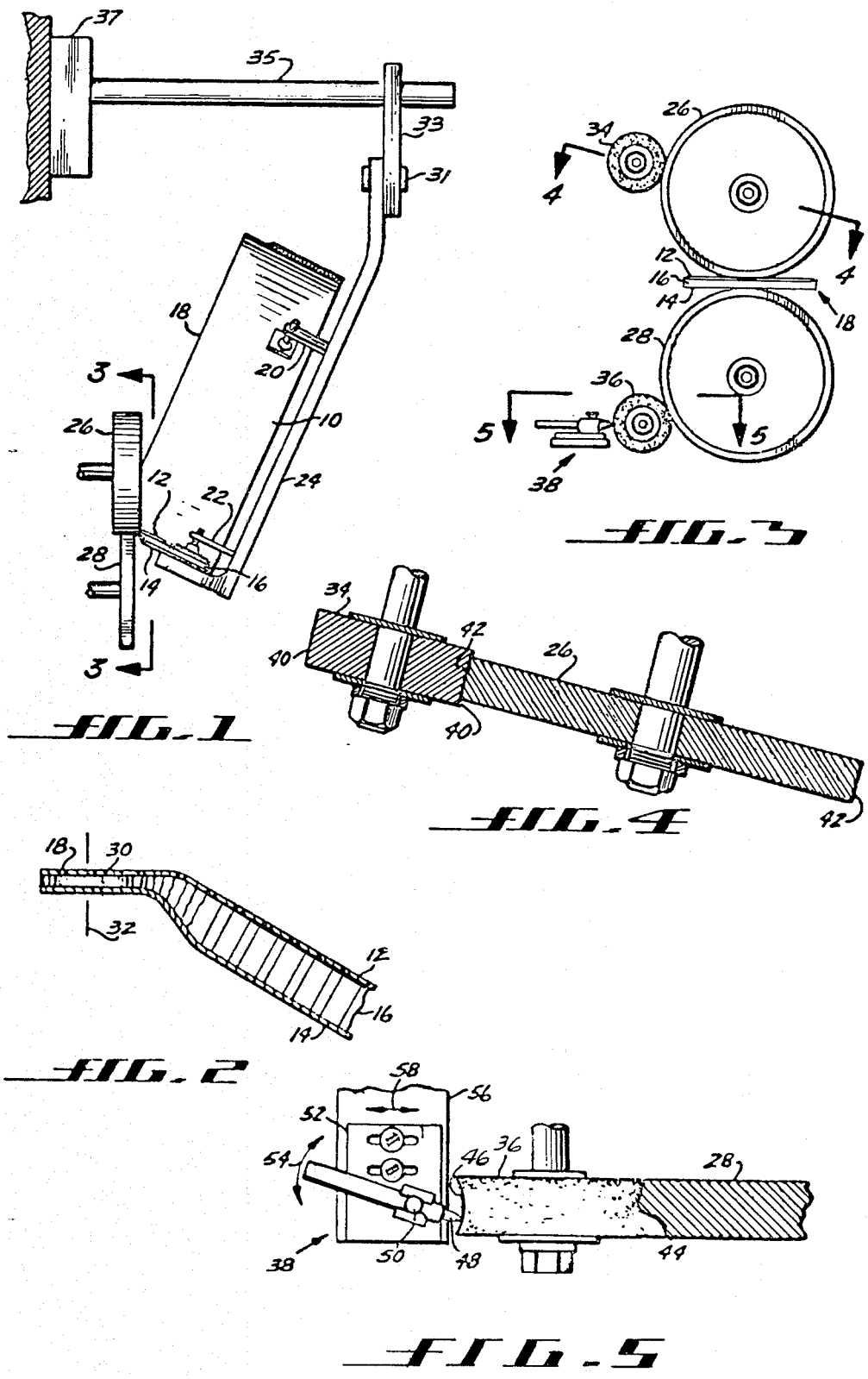

RESISTANCE WELDING OF HONEYCOMB PANEL EDGES

RELATED APPLICATIONS

This is a continuation of application Ser. No. 337,662 filed Mar. 2, 1973 and now abandoned.

BACKGROUND OF THE INVENTION

A honeycomb panel has a honeycomb structured core between two facing sheets. To provide a solid edging, the facing sheets and core are crushed from an original thickness of three-fourth inch to a crushed thickness of about 0.125 inch, for example, and then resistance seam welded. The surface of the seamweld is irregular due to the crushed core material and voids of the cell structure. Since the welding pressure is relatively high, the irregular surface impressions are transferred to the face of the copper electrode wheels, causing a variable resistance to the welding current as the wheels rotate during the welding operation. This interference with welding control may result in inadequate welds or burning of the metal, which of course cannot be tolerated. Thus, the electrode wheels frequently had to be removed, their faces machined down on a lathe and then replaced for another length of welding. Obviously, this was very time consuming since multiple adjustments were required before the welding operation could be resumed.

SUMMARY OF THE PRESENT INVENTION

The resistance seamwelding method of the present invention provides a solid edging along the edge of a honeycomb panel in which the face sheets have been crushed together, crumpling the honeycomb core in between. The face sheets may be either solid or perforated. Controlled crushing is necessary to eliminate the electrode wheels from spinning in place while welding. In one example, a three-fourth inch thick panel is crushed along its edge to a thickness of no more than 0.125 inch.

A number of passes over the weld area is required to consummate a seamweld, starting with a first pass of low weld current setting and increasing the current on each succeeding pass. This technique eliminates surface burning and minimizes metal expulsion at the interface. The seamweld provides a continuous solid weld nugget approximately one-half inch wide joining the facing sheets together. The panel is then trimmed through the weld longitudinally, creating the desired panel edging.

The impression of the irregular surface of the seamweld transferred to the face of the copper electrode wheels under the relatively high exerted welding pressure is continuously removed by air-operated abrasive wheels attached to the welder to maintain the proper shape of the wheel faces during the welding operation. They also keep the wheel faces free from imbedded metal, scale or other contaminates. In addition to the wheel dressing feature, the abrasive wheels are reshaped periodically with a single point diamond dresser on the welder.

BRIEF DESCRIPTION OF THE ILLUSTRATIVE EMBODIMENT

FIG. 1 is an illustrative end view of a honeycomb panel suitably supported for edge welding between electrode wheels in the resistance seamwelding process, FIG. 2 is an end view of the welded panel before the longitudinal cut is made through the weld, FIG. 3 is a side view taken along the line 3—3 of FIG. 1 illustrating the seamwelding operation while continuously dressing the electrode wheels, FIG. 4 is a sectional view taken along the line 4—4 of FIG. 3, and FIG. 5 is a sectional view taken along the line 5—5 of FIG. 3.

DETAILED DESCRIPTION OF ILLUSTRATIVE EMBODIMENT

Referring now to FIG. 1 there is shown an arcuate honeycomb panel 10 consisting of an inner perforated face sheet 12 and outer solid unperforated face sheet 14 of stainless steel with a metallic honeycomb core 16 bonded thereto and inbetween. This panel 10 had previously been stretch formed to shape as an acoustic sound suppression panel as part of the inner lining in a jet engine housing. The face sheets 12 and 14 also have been crushed together along edge 18 with core 16 crumpled inbetween as can be more clearly seen in FIG. 2.

In FIG. 1 panel 10 is clamped by means of clamps 20 and 22 to a pivoted arm 24 in such manner that panel edge 18 passes between electrode wheels 26 and 28. Arm 24 pivots at 31 to a bracket 33 which, in turn, is slidably movable along mounting bar 35. This mounting bar 35 is vertically adjustable relative to support member 37. Thus it can be seen that with proper adjustment, edge 18 may be arcuate or non-planar and still be capable of passing between the electrode wheels.

The electrode wheels 26, 28 preferably are of copper alloy for better welding capability. A standard ¾ inch wide, 3 inch radius faced seam welding wheel 28 may be used against the solid facing sheet 14. A wider seam welding wheel 26, 1½ inches wide, is used against the perforated sheet 12 to eliminate surface deformation and all indentation resulting when the seam welding takes place on the solid facing sheet.

A number of passes is required to consummate a seamweld starting with the first pass using a low weld current and increasing the current on each succeeding pass. This technique eliminates surface burning and minimizes metal expulsion at the interface. In one example, shown in FIG. 2, a three-fourth inch thick stainless steel panel having a 0.020 inch solid sheet 14 and a 0.016 inch perforated facing sheet 12 with a 0.0025 inch core ribbon 16 was crushed to about 0.125 inch along the edge 18 where it was to be welded. The electrode wheel pressure was 2,000 pounds, the welding speed was 11 inches per minute. With a 60 cycle current a weld heat time and cool time of 10 cycles each was used. Approximately, 11,500 Sec. amps current was used for the first pass, 17,500 Sec. Amps during the second and 22,500 Sec. Amps for the third. This seamweld provided a continuous solid weld nugget 30 approximately three-eighths inch wide joining the facing sheets 12, 14 together. Thereafter, the edge 18 is trimmed longitudinally through the weld 30 along line 32 to create the solid edging.

A side view of the welding wheels 26, 28 is shown in FIG. 3 with the compressed edge 18 of panel 10 being passed therebetween. The face sheets 12 and 14 are of stainless steel and must be subjected to a 2,000 pound electrode wheel welding force. The softer faces of the copper wheels deform because of the crumpled core impression through the face sheets and this deformation on the wheel surface changes the contact resistance on the next wheel rotation. For this reason continuous dressing of the faces of electrode wheels 26, 28 is desirable and may be accomplished with air powered abrasive wheels 34, 36 rotating in a counter-direction to that of the electrode wheels. These abrasive wheels are resin bonded and should have a 10 to 1 wear ratio with the electrode wheels for their proper dressing. Thus, by volume, 10 units of abrasive are removed from the abrasive wheels for each unit of copper alloy from the electrode wheel. Periodically the abrasive wheels may be reshaped with a single point diamond dresser 38.

The sectional view of FIG. 4 shows abrasive wheel 34 having a straight face 40 abrasively contacting the straight face 42 of electrode wheel 26. Electrode wheel 28 in FIG. 5 has a convex face 44 which is kept dressed in this configuration by the concave curvature of face 46 of abrasive wheel 36 rotating in contact therewith. Face 46 of wheel 36 may be kept in its desired configuration by diamond point 48 on dresser 38. This point is pivotally mounted at 50 to mounting plate 52 and is adapted to rotate as shown by arcuate double arrow 54. This mounting plate 52 is adjustably mounted on stand 56 to move in the direction of double arrow 58. Thus it can be seen that with proper adjustment, any curvature on face 46 of grinding wheel 36 is possible.

Having thus described an illustrative embodiment, it is to be understood that variations will readily occur to those skilled in the art and it is to be understood that these modifications are to be considered as part of the present invention as set forth in appended claims.

I claim:

1. The method of providing a solid edging to a honeycomb panel consisting of a honeycomb core between face sheets, said method comprising the steps of:
   1. crushing the edges of the face sheets together and crumpling the honeycomb core in between,
   2. passing the face sheet edges and crumpled core between a pair of electrode wheels under a pressure of approximately 2,000 pounds,
   3. passing said edges and core between said wheels a multiple of times at successively higher weld current settings to resistance seamweld said face sheet edges and crumpled core into a continuous solid weld nugget joining the face sheets together, and
   4. trimming through the weld longitudinally to create the solid edging on the panel; wherein the crumpled core between the face sheets makes an impression on the faces of the electrode wheels, and wherein the impressions are continuously removed as the electrode wheels rotate in their welding operation with rotating abrasive wheels having faces compatible with the faces of the electrode wheels to maintain their desired configuration.

2. The method of providing a solid edging as in claim 1 wherein said abrasive wheels have their faces dressed while in turn the abrasive wheels are dressing the faces of said electrode wheels.

* * * * *